US010379008B2

(12) United States Patent
Mizuno et al.

(10) Patent No.: US 10,379,008 B2
(45) Date of Patent: Aug. 13, 2019

(54) RAILWAY VEHICLE CONDITION MONITORING APPARATUS

(71) Applicants: NIPPON STEEL & SUMITOMO METAL CORPORATION, Tokyo (JP); The University of Tokyo, Tokyo (JP)

(72) Inventors: Masaaki Mizuno, Tokyo (JP); Masuhisa Tanimoto, Osaka (JP); Kensuke Nagasawa, Osaka (JP); Yoshihiro Suda, Tokyo (JP); Shihpin Lin, Tokyo (JP); Kensuke Kimoto, Tokyo (JP)

(73) Assignees: NIPPON STEEL CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 133 days.

(21) Appl. No.: 15/534,064

(22) PCT Filed: Dec. 15, 2015

(86) PCT No.: PCT/JP2015/085085
§ 371 (c)(1),
(2) Date: Jun. 8, 2017

(87) PCT Pub. No.: WO2016/098773
PCT Pub. Date: Jun. 23, 2016

(65) Prior Publication Data
US 2017/0363517 A1    Dec. 21, 2017

(30) Foreign Application Priority Data

Dec. 15, 2014 (JP) .................. 2014-253515

(51) Int. Cl.
G01M 17/08 (2006.01)
B61F 5/24 (2006.01)
B61K 13/00 (2006.01)

(52) U.S. Cl.
CPC ............... *G01M 17/08* (2013.01); *B61F 5/24* (2013.01); *B61K 13/00* (2013.01)

(58) Field of Classification Search
None
See application file for complete search history.

(56) References Cited

U.S. PATENT DOCUMENTS

2009/0175509 A1    7/2009  Gonion et al.
2014/0200952 A1*   7/2014  Hampapur .............. B61K 9/08
                                                   705/7.28

FOREIGN PATENT DOCUMENTS

DE    10 2008 028 264    12/2009
EP         1600351        11/2005
(Continued)

*Primary Examiner* — Lail A Kleinman
(74) *Attorney, Agent, or Firm* — Clark & Brody

(57) ABSTRACT

A railway vehicle condition monitoring apparatus includes a detection device for detecting vehicle information represented by a wheel load or the like of a wheel included in a railway vehicle running on a railroad track, and a determination device including a classifier to which the vehicle information detected by the detection device is input and which outputs a vehicle condition such as the presence or absence of an abnormality of the railway vehicle. The classifier is generated by means of machine learning that uses training data of a railway vehicle of which the vehicle condition is known, the training data being the vehicle information and the vehicle condition which is known, the machine learning being performed so that when the vehicle information of the training data is input to the classifier, the classifier outputs the vehicle condition of the training data.

8 Claims, 7 Drawing Sheets

(56) References Cited

FOREIGN PATENT DOCUMENTS

| | | |
|---|---|---|
| JP | 2009-220815 | 10/2009 |
| JP | 2011-051518 | 3/2011 |
| JP | 2012-058207 | 3/2012 |
| JP | 5085175 | 11/2012 |
| JP | 5139163 | 2/2013 |
| JP | 2013-511704 | 4/2013 |
| JP | 2013-120100 | 6/2013 |

* cited by examiner $$P_N = \prod_{i=1}^{3} n_i = n_1 \times n_2 \times n_3 \quad \cdots (4)$$

$$P_A = \prod_{i=1}^{3} a_i = a_1 \times a_2 \times a_3 \quad \cdots (5)$$

$$P_B = \prod_{i=1}^{3} b_i = b_1 \times b_2 \times b_3 \quad \cdots (6)$$

| Composition | Car No. | Abnormality (simulation) | Determination result |
|---|---|---|---|
| a | 7 | Front inner rail air supply | Front inner rail air supply |
|   | 6 | Front inner rail exhaust | Front inner rail exhaust |
|   | 4 | Single-axle outer rail breakage | Single-axle outer rail breakage |
|   | 6 | Front outer rail air supply | Front outer rail air supply |
|   | 4 | Front outer rail exhaust | Front outer rail exhaust |
|   | 7 | Single-axle inner rail breakage | Single-axle inner rail breakage |
| b | 6 | Single-axle inner rail breakage | Single-axle inner rail breakage |
|   | 6 | Front outer rail air supply | Front outer rail air supply |
|   | 7 | Front outer rail exhaust | Front outer rail exhaust |
|   | 4 | Front inner rail exhaust | Front inner rail exhaust |
|   | 4 | Single-axle outer rail breakage | Single-axle outer rail breakage |
|   | 7 | Front inner rail air supply | Front inner rail air supply |
| c | 4 | Front inner rail air supply | Front inner rail air supply |
|   | 6 | Single-axle inner rail breakage | Single-axle inner rail breakage |
|   | 6 | Front outer rail air supply | Front outer rail air supply |
|   | 7 | Single-axle outer rail breakage | Single-axle outer rail breakage |
|   | 4 | Front outer rail exhaust | Front outer rail exhaust |
|   | 7 | Front inner rail exhaust | Front inner rail exhaust |
| d | 4 | Single-axle inner rail breakage | Single-axle inner rail breakage |
|   | 7 | Front outer rail air supply | Front outer rail air supply |
|   | 6 | Single-axle outer rail breakage | Single-axle outer rail breakage |
|   | 4 | Front inner rail air supply | Front inner rail air supply |
|   | 6 | Front inner rail exhaust | Front inner rail exhaust |
|   | 7 | Front outer rail exhaust | Front outer rail exhaust |
| e | 7 | Front outer rail exhaust | Front outer rail exhaust |
|   | 6 | Single-axle outer rail breakage | Single-axle outer rail breakage |
|   | 6 | Front inner rail exhaust | Front inner rail exhaust |
|   | 4 | Front outer rail air supply | Front outer rail air supply |
|   | 7 | Front inner rail air supply | Front inner rail air supply |
|   | 4 | Single-axle inner rail breakage | Single-axle inner rail breakage |

Figure 3

| Compo-sition | Determination result | Car No. 4 Number of determination | Car No. 4 Percentage (%) | Car No. 6 Number of determination | Car No. 6 Percentage (%) | Car No. 7 Number of determination | Car No. 7 Percentage (%) |
|---|---|---|---|---|---|---|---|
| a | Normal | 40 | 87 | 44 | 95.7 | 46 | 100 |
| | Front inner rail exhaust | 0 | 0 | 0 | 0 | 0 | 0 |
| | Front outer rail exhaust | 6 | 13 | 2 | 4.3 | 0 | 0 |
| | Front inner rail air supply | 0 | 0 | 0 | 0 | 0 | 0 |
| | Front outer rail air supply | 0 | 0 | 0 | 0 | 0 | 0 |
| | Single-axle inner rail breakage | 0 | 0 | 0 | 0 | 0 | 0 |
| | Single-axle outer rail breakage | 0 | 0 | 0 | 0 | 0 | 0 |
| b | Normal | 62 | 100 | 61 | 98.4 | 61 | 98.4 |
| | Front inner rail exhaust | 0 | 0 | 0 | 0 | 0 | 0 |
| | Front outer rail exhaust | 0 | 0 | 1 | 1.6 | 1 | 1.6 |
| | Front inner rail air supply | 0 | 0 | 0 | 0 | 0 | 0 |
| | Front outer rail air supply | 0 | 0 | 0 | 0 | 0 | 0 |
| | Single-axle inner rail breakage | 0 | 0 | 0 | 0 | 0 | 0 |
| | Single-axle outer rail breakage | 0 | 0 | 0 | 0 | 0 | 0 |
| c | Normal | 41 | 100 | 41 | 100 | 41 | 100 |
| | Front inner rail exhaust | 0 | 0 | 0 | 0 | 0 | 0 |
| | Front outer rail exhaust | 0 | 0 | 0 | 0 | 0 | 0 |
| | Front inner rail air supply | 0 | 0 | 0 | 0 | 0 | 0 |
| | Front outer rail air supply | 0 | 0 | 0 | 0 | 0 | 0 |
| | Single-axle inner rail breakage | 0 | 0 | 0 | 0 | 0 | 0 |
| | Single-axle outer rail breakage | 0 | 0 | 0 | 0 | 0 | 0 |
| d | Normal | 63 | 100 | 62 | 98.4 | 63 | 100 |
| | Front inner rail exhaust | 0 | 0 | 0 | 0 | 0 | 0 |
| | Front outer rail exhaust | 0 | 0 | 1 | 1.6 | 0 | 0 |
| | Front inner rail air supply | 0 | 0 | 0 | 0 | 0 | 0 |
| | Front outer rail air supply | 0 | 0 | 0 | 0 | 0 | 0 |
| | Single-axle inner rail breakage | 0 | 0 | 0 | 0 | 0 | 0 |
| | Single-axle outer rail breakage | 0 | 0 | 0 | 0 | 0 | 0 |
| e | Normal | 51 | 100 | 49 | 96.1 | 49 | 96.1 |
| | Front inner rail exhaust | 0 | 0 | 0 | 0 | 0 | 0 |
| | Front outer rail exhaust | 0 | 0 | 1 | 2 | 2 | 3.9 |
| | Front inner rail air supply | 0 | 0 | 0 | 0 | 0 | 0 |
| | Front outer rail air supply | 0 | 0 | 0 | 0 | 0 | 0 |
| | Single-axle inner rail breakage | 0 | 0 | 0 | 0 | 0 | 0 |
| | Single-axle outer rail breakage | 0 | 0 | 1 | 2 | 0 | 0 |

Figure 4

| Series of trains | Train Composition | Accuracy (%) |
|---|---|---|
| X | a | 100 |
|   | b | 100 |
|   | c | 100 |
|   | d | 100 |
|   | e | 100 |
|   | f | 98.9 |
|   | g | 100 |
|   | h | 100 |
|   | i | 100 |
|   | j | 100 |
| Y | k | 98.9 |
|   | l | 90.8 |
|   | m | 100 |
|   | n | 98.8 |
|   | o | 96 |
|   | p | 95.8 |
|   | q | 95.3 |
|   | r | 98.8 |
|   | s | 98.7 |
|   | t | 98.6 |
|   | u | 93.3 |
| Overall | | 98.4 |

Figure 6

RAILWAY VEHICLE CONDITION MONITORING APPARATUS

TECHNICAL FIELD

The present invention relates to a railway vehicle condition monitoring apparatus which is configured to detect vehicle information represented by a wheel load of wheels or the like of a railway vehicle running on a railroad track, and which determines a vehicle condition such as a presence or absence of an abnormality of the railway vehicle based on the detected vehicle information. More particularly, the present invention relates to a railway vehicle condition monitoring apparatus by which a determination can be easily performed without requiring a great deal of time and effort to adjust parameters for determining a vehicle condition.

BACKGROUND ART

Conventionally, in order to improve running safety of a railway vehicle, online real-time monitoring for detecting an abnormality of a commercial vehicle (a railway vehicle in commercial operation) while the commercial vehicle is running has been implemented using various sensors which are attached to the commercial vehicle by monitoring a condition of the commercial vehicle running on a commercial line using the sensors (for example, see Patent Literatures 1 and 2).

However, when using the above method to detect abnormalities in railway vehicles while the railway vehicles are running, it is necessary to attach the sensors to all the railway vehicles, and time and labor are required to maintain and inspect the sensors and the like. Consequently, problems arise in that abnormalities in the railway vehicles cannot be easily detected and also that the method involves a great deal of expense.

To solve the aforementioned problems, a method has been proposed in which a wheel load sensor for measuring a wheel load of wheels is provided on a railroad track, and an abnormality of a railway vehicle is detected based on the size of an index represented by a wheel load measured by the wheel load sensor (for example, see Patent Literature 3).

According to the above method, abnormalities in railway vehicles can be detected more easily and with less cost in comparison to a case where a sensor is attached to each railway vehicle.

However, the respective methods described in Patent Literatures 1 to 3 are methods that compare an evaluation index with a predetermined threshold value and detects an abnormality of a railway vehicle depending on whether the evaluation index is larger or smaller than the threshold value. An appropriate threshold value for detecting an abnormality can vary depending on a structure of the railway vehicle, loading conditions, running conditions and the like. Consequently, in order to accurately detect an abnormality, it is necessary to determine a large number of threshold values for each of the conditions, which requires a large amount of time and labor.

CITATION LIST

Patent Literature

[Patent Literature 1] JP2009-220815A
[Patent Literature 2] JP2011-51518A
[Patent Literature 3] JP2013-120100A

SUMMARY OF INVENTION

Technical Problem

The present invention has been made to solve the aforementioned problems of the prior art, and an object of the present invention is to provide a railway vehicle condition monitoring apparatus which is capable of easily performing a determination without requiring a great deal of time and effort to adjust parameters for determining a vehicle condition such as a presence or absence of an abnormality of a railway vehicle.

Solution to Problem

To achieve the above object, a railway vehicle condition monitoring apparatus of the present invention includes a detection device which is configured to detect vehicle information represented by a wheel load or the like of a wheel included in a railway vehicle running on a railroad track, and a determination device including a classifier to which the vehicle information detected by the detection device is input and which is configured to output a vehicle condition such as a presence or absence of an abnormality of the railway vehicle. Further, the classifier is generated by means of machine learning which is performed by using training data of a railway vehicle of which the vehicle condition is known, the training data being the vehicle information and the vehicle condition which is known, the machine learning being performed so that when the vehicle information of the training data is input to the classifier, the classifier outputs the vehicle condition of the training data.

According to the present invention, a classifier is generated by means of machine learning using vehicle information represented by a wheel load of wheels or the like of a railway vehicle of which a vehicle condition such as the presence or absence of an abnormality of a vehicle is known and a vehicle condition as training data (a combination of vehicle information which is input and a vehicle condition which is output). Further, when vehicle information is detected by the detection device and the detected vehicle information is input into the classifier, a vehicle condition is output as a determination result from the classifier. According to the present invention, since it is only required to generate a classifier by means of machine learning using data which is known and it is not required to use a considerable amount of time and labor to determine threshold values as in the conventional art, a vehicle condition can be easily determined.

Preferably, the vehicle information which is detected by the detection device and which is input to the classifier is represented by a wheel load of a wheel included in the railway vehicle, and as the vehicle condition, the classifier outputs a presence or absence of an abnormality and a class of an abnormality of the railway vehicle.

More particularly, for example, the railway vehicle includes a pair of front and rear bogies which each have two pairs of right and left wheels in front and rear sides, vehicle information which is detected by the detection device is a primary spring abnormality index of the front bogie and a primary spring abnormality index of the rear bogie of the railway vehicle which are represented by Expression (1) and Expression (2) below, respectively, and a secondary spring abnormality index of the railway vehicle which is represented by Expression (3) below, and a vehicle condition which is output from the classifier is a presence or absence of an abnormality and a class of an abnormality of the railway vehicle, $$\text{primary spring abnormality index of front bogie} = (P1+P4)-(P2+P3) \quad (1)$$

$$\text{primary spring abnormality index of rear bogie} = (P5+P8)-(P6+P7) \quad (2)$$

$$\text{secondary spring abnormality index of railway vehicle} = (P1+P3+P6+P8)-(P2+P4+P5+P7) \quad (3)$$

where P1 represents a wheel load of a wheel located in a front right side of the front bogie, P2 represents a wheel load of a wheel located in a front left side of the front bogie, P3 represents a wheel load of a wheel located in a rear right side of the front bogie, P4 represents a wheel load of a wheel located in a rear left side of the front bogie, P5 represents a wheel load of a wheel located in a front right side of the rear bogie, P6 represents a wheel load of a wheel located in a front left side of the rear bogie, P7 represents a wheel load of a wheel located in a rear right side of the rear bogie, and P8 represents a wheel load of a wheel located in a rear left side of the rear bogie.

The term "primary spring abnormality" refers to an abnormality in a primary spring (axle spring) which is provided in a bogie, and breakage of a coil spring provided in the bogie can be mentioned as an example thereof.

A primary spring is provided in each of wheels. When a primary spring of any of the wheels becomes abnormal, the weight of the bogie applied to the wheel in which the primary spring is provided is applied to wheels located in a front-rear direction and a left-right direction relative to the relevant wheel in the bogie. For example, when the primary spring of a wheel on the front right side of the bogie becomes abnormal, the weight of the bogie which has been applied to the wheel on the front right side is applied to the wheel on the front left side and the wheel on the rear right side. In this way, when a primary spring abnormality occurs, an influence of the abnormality extends to wheels which are located in a front-rear direction and a left-right direction relative to the wheel at which the primary spring abnormality occurs.

Thus, it is considered that a primary spring abnormality of a front bogie can be detected by evaluating a difference between a total of the respective wheel loads of the wheels located in the front right side and the rear left side of the front bogie (P1+P4), and a total of the respective wheel loads of the wheels located in the front left side and the rear right side of the front bogie (P2+P3). Therefore, in the above described preferable configuration, a primary spring abnormality index for a front bogie which is represented by Expression (1) is used as vehicle information which is detected by the detection device (vehicle information which is input to the classifier). A primary spring abnormality index for a rear bogie which is represented by Expression (2) is used for the same reason.

On the other hand, the term "secondary spring abnormality" refers to an abnormality in a secondary spring provided in a bogie, and an abnormality in the air supply/exhaust of an air spring provided in a bogie can be mentioned as an example thereof.

A secondary spring is provided on the left side and right side of each of the front and rear bogies, in other words, on the front right, front left, rear right, and rear left sides of the railway vehicle. When a secondary spring of either of the bogies becomes abnormal and cannot support the weight of the vehicle body, the weight of the vehicle body which has been applied to the wheels on the side of the bogie provided with the relevant secondary spring is applied to the wheels in the vicinity of secondary springs which are located in a front-rear direction and a left-right direction relative to the relevant secondary spring. For example, if the secondary spring on the right side of the front bogie becomes abnormal, the weight of the vehicle body which has been applied to the wheels (a pair of front and rear wheels) located in the right side of the front bogie is applied to the wheels (a pair of front and rear wheels) located in the left side of the front bogie and the wheels (a pair of front and rear wheels) located in the right side of the rear bogie. In this way, when a secondary spring abnormality occurs, an influence of the abnormality extends to wheels in the vicinity of secondary springs which are located in a front-rear direction and a left-right direction of the secondary spring at which the abnormality occurs.

Thus, it is considered that a secondary spring abnormality of a railway vehicle can be detected by evaluating a difference between a total of the respective wheel loads of the wheels located in the right side of the front bogie and the left side of the rear bogie (P1+P3+P6+P8) and a total of the respective wheel loads of the wheels located in the left side of the front bogie and the right side of the rear bogie (P2+P4+P5+P7). Therefore, in the above described preferable configuration, a secondary spring abnormality index for a railway vehicle which is represented by Expression (3) is used as vehicle information which is detected by the detection device (vehicle information which is input to the classifier).

As described above, in the above described preferable configuration, because a primary spring abnormality index for a front bogie, a primary spring abnormality index for a rear bogie and a secondary spring abnormality index for a railway vehicle are used as vehicle information which is detected (vehicle information which is input to a classifier), enhancement of the determination accuracy can be expected with respect to determining the presence or absence of an abnormality (an abnormality relating to primary springs and secondary springs) in a vehicle and the class of an abnormality which are output from a classifier as determination results.

Note that, as will be understood from Expressions (1) to (3), a primary spring abnormality index for a front bogie, a primary spring abnormality index for a rear bogie and a secondary spring abnormality index for a railway vehicle can be calculated by detecting the wheel loads of the wheels. The wheel load of a wheel can be detected by, for example, as described in Patent Literature 3, installing a wheel load sensor which uses a strain gauge, or a load cell on a railroad track.

The aforementioned primary spring abnormality indexes of the front and rear bogies and the secondary spring abnormality index of the railway vehicle serve as indexes for detecting an abnormality involving a primary spring or a secondary spring and at the same time can also be considered to serve as indexes which indicate individual differences between railway vehicles. That is, it is also conceivable to use the aforementioned indexes as indexes for distinguishing one railway vehicle from another railway vehicle, in other words as indexes for determining the train composition.

In this case, similarly to the above described preferable configuration, while on one hand the primary spring abnormality index of a front bogie, the primary spring abnormality index of a rear bogie and the secondary spring abnormality index of a railway vehicle are used as vehicle information which is detected (vehicle information which is input to a classifier), on the other hand the vehicle condition as the determination result is the train composition.

That is, preferably, the railway vehicle includes a pair of front and rear bogies which each have two pairs of right and left wheels in front and rear sides, vehicle information which is detected by the detection device is a primary spring abnormality index of the front bogie and a primary spring abnormality index of the rear bogie of the railway vehicle which are represented by Expression (1) and Expression (2) above, respectively, and a secondary spring abnormality index of the railway vehicle which is represented by Expression (3) above, and a vehicle condition which is output from the classifier is a train composition of the railway vehicle.

According to the above preferable configuration, without receiving information relating to the train composition from outside, the train composition can be determined using only vehicle information detected by the detection device (primary spring abnormality index of a front bogie and primary spring abnormality index of a rear bogie of the railway vehicle and secondary spring abnormality index of the railway vehicle). Therefore, for example, both a classifier (first classifier) which is configured to output the presence or absence of an abnormality and the class of an abnormality of a railway vehicle, as in the foregoing preferable configuration, and a classifier (second classifier) which is configured to output a train composition as in the present preferable configuration are generated to provide a determination device, and by inputting vehicle information which is detected by the detection device into both the first classifier and the second classifier, respectively, the presence or absence of an abnormality and the class of an abnormality of a railway vehicle as well as a train composition of the railway vehicle can be determined simultaneously. By this configuration, the kind of train composition in which the presence or absence of an abnormality and the class of an abnormality of a railway vehicle were determined can be easily identified without the necessity of receiving information relating to the train composition from outside and linking the received information to a determination result such as the presence or absence of an abnormality of a railway vehicle.

In this case, in order to generate a classifier (first classifier) which outputs the presence or absence of an abnormality and a class of an abnormality of a railway vehicle as a vehicle condition, training data with respect to a normal railway vehicle (railway vehicle with no abnormalities) and training data with respect to an abnormal railway vehicle are required at the time of machine learning.

Training data with respect to a normal railway vehicle can be easily prepared since it is possible to actually detect vehicle information of a normal railway vehicle (primary spring abnormality index of a front bogie and primary spring abnormality index of a rear bogie of the railway vehicle, and secondary spring abnormality index of the railway vehicle). In contrast, training data with respect to an abnormal railway vehicle is not easy to prepare because it is difficult to actually detect the vehicle information since preparing an abnormal railway vehicle is in itself difficult (moreover, it is extremely difficult to prepare a large number of abnormal railway vehicles).

Consequently, with regard to training data with respect to an abnormal railway vehicle, as such vehicle information it is preferable to use training data which is calculated, for example, by means of numerical simulation using general-purpose mechanism analysis software based on vehicle information which was detected with respect to a normal railway vehicle.

That is, preferably, the classifier is generated by means of machine learning which is performed by using, as the vehicle information of the training data, a primary spring abnormality index of the front bogie, a primary spring abnormality index of the rear bogie and a secondary spring abnormality index of the railway vehicle which are actually detected by the detection device with respect to an normal railway vehicle, and a primary spring abnormality index of the front bogie, a primary spring abnormality index of the rear bogie and a secondary spring abnormality index of the railway vehicle with respect to an abnormal railway vehicle which are calculated by means of numerical simulation based on the primary spring abnormality index of the front bogie, the primary spring abnormality index of the rear bogie and the secondary spring abnormality index of the railway vehicle with respect to the normal railway vehicle, and using, as the vehicle condition of the training data, a known presence or absence of an abnormality and a known class of an abnormality with respect to the normal railway vehicle and the abnormal railway vehicle, the machine learning being performed so that when vehicle information of the normal railway vehicle and the abnormal railway vehicle is input to the classifier, the classifier outputs a vehicle condition of the normal railway vehicle and the abnormal railway vehicle.

According to the above preferable configuration, since it is not necessary to prepare vehicle information which was actually detected with respect to an abnormal railway vehicle as training data for machine learning of a classifier, machine learning can be easily performed.

Although the vehicle information can also be detected using a sensor which is provided on each railway vehicle, in consideration of the time and labor as well as cost involved in maintenance and inspection and the like, it is preferable to detect the vehicle information using a sensor which is provided on a railroad track.

That is, preferably, the detection device includes a sensor which is provided on the railroad track. However, the detection device can also include a sensor which is provided on the railway vehicle. A wheel load sensor described in the aforementioned Patent Literature 3 can be mentioned as an example of a sensor which is provided on a railroad track, and a sensor described in the aforementioned Patent Literatures 1 and 2 can be mentioned as an example of a sensor which is provided on a railway vehicle.

Various configurations can be adopted as the classifier as long as the classifier can be generated using machine learning, such as a support vector machine or a neural network, and in particular a naive Bayes classifier which has the advantages of a simple mechanism and a fast computational speed is preferably used.

Advantageous Effect of Invention

According to the present invention, since it is only required to generate a classifier by means of machine learning using data which is known and it is not required to use a considerable amount of time and labor to determine threshold values as in the conventional art, a vehicle condition can be easily determined.

BRIEF DESCRIPTION OF DRAWINGS

FIG. 3 is a view illustrating determination results obtained in a case where vehicle information for an abnormal railway vehicle among determination object data was input into the classifier illustrated in FIGS. 1A and 1B.

FIG. 4 is a view illustrating determination results obtained in a case where vehicle information for a normal railway vehicle among determination object data was input into the classifier illustrated in FIGS. 1A and 1B.

FIG. 6 is a view illustrating determination results obtained in a case where determination object data was input into the classifier illustrated in FIGS. 5A and 5B.

DESCRIPTION OF EMBODIMENTS

Hereunder, a railway vehicle condition monitoring apparatus (hereunder, abbreviated as "monitoring apparatus" as appropriate) according to respective embodiments of the present invention is described by appropriately referring to the accompanying drawings. First, the overall configuration is described.

Overall Configuration

Figure 7:
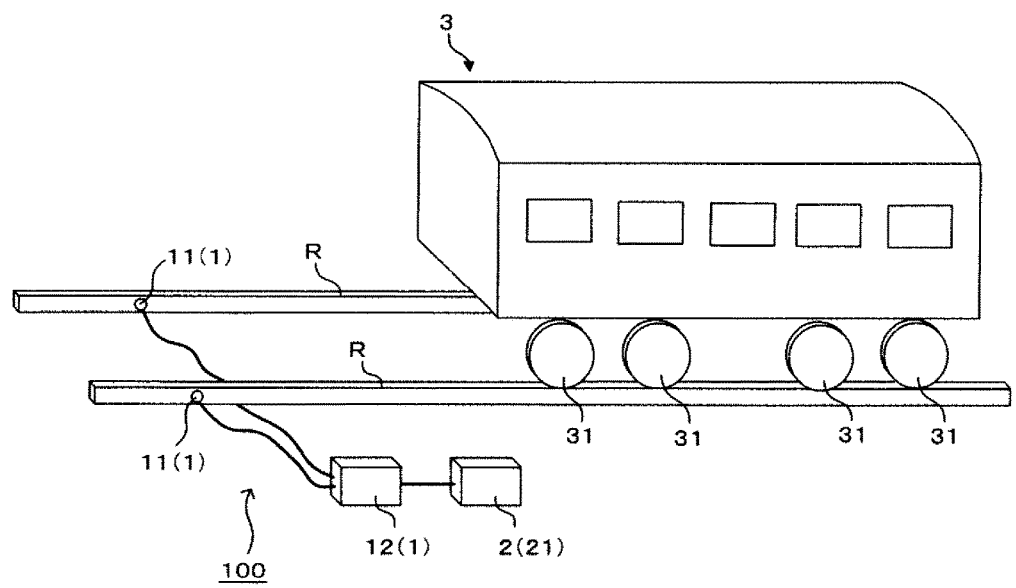
FIG. 7 is a schematic diagram illustrating the schematic configuration of a railway vehicle condition monitoring apparatus according to the first and second embodiments of the present invention.

FIG. 7 is a schematic diagram illustrating the schematic configuration of a monitoring apparatus according to embodiments of the present invention. Note that a monitoring apparatus according to a first embodiment and a monitoring apparatus according to a second embodiment (hereunder, as appropriate, these are referred to collectively as "monitoring apparatus according to the present embodiments") which are described later have an common overall configuration with respect to each other as illustrated in FIG. 7 and differ from each other only in regard to a method for generating a classifier of a determination device, and a determination method (determination contents) which is carried out by means of the classifier.

As illustrated in FIG. 7, a monitoring apparatus 100 according to the present embodiments includes a detection device 1 which is configured to detect vehicle information represented by a wheel load of wheels 31 included in a railway vehicle 3 running on a railroad track, and a determination device 2 which includes a classifier 21 to which the vehicle information detected by the detection device is input and which is configured to output a vehicle condition such as the presence or absence of an abnormality of the railway vehicle 3.

The detection device 1 of the monitoring apparatus 100 according to the present embodiments includes wheel load sensors 11 which are attached to right and left rails R constituting a railroad track and are used for measuring wheel loads of the wheels 31 which are included in the railway vehicle 3, and a calculation unit 12 which is connected to the wheel load sensors 11. A wheel load sensor which uses a strain gauge as described in the aforementioned Patent Literature 3 or a load cell can be used as the wheel load sensors 11. The calculation unit 12 calculates respective abnormality indexes as described later, based on the wheel loads which are measured by the wheel load sensors 11 and are transmitted from the wheel load sensors 11. Specifically, for example, a PC (personal computer) in which calculation formulas (Expression (1) to Expression (3)) for calculating the respective abnormality indexes are stored, and in which a program for calculating the respective abnormality indexes by substituting the wheel loads transmitted from the wheel load sensors 11 into the aforementioned calculation formulas is installed is adopted as the calculation unit 12. The calculation unit 12 outputs each of the calculated abnormality indexes to the determination device 2 (classifier 21) as vehicle information.

For example, a PC in which a program is installed and which performs a function as the classifier 21 which is generated using machine learning and which outputs a vehicle condition in accordance with vehicle information which is input thereto is adopted as the determination device 2 of the monitoring apparatus 100 according to the present embodiments.

Note that, although in the monitoring apparatus 100 illustrated in FIG. 7, the calculation unit 12 of the detection device 1 and the determination device 2 are separate members to each other, the present invention is not limited thereto, and a configuration can also be adopted which uses a single PC in which a program that performs the functions of both the calculation unit 12 and the determination device 2 is installed.

Hereunder, the monitoring apparatus 100 according to the first and second embodiments of the present invention, will be described in order.

First Embodiment

Figure 1A:
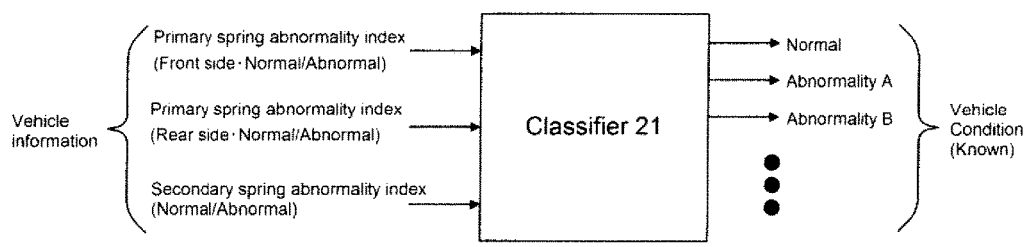
FIGS. 1A and 1B are block diagrams for illustrating a classifier included in a determination device of a railway vehicle condition monitoring apparatus according to a first embodiment of the present invention.
Figure 1B:
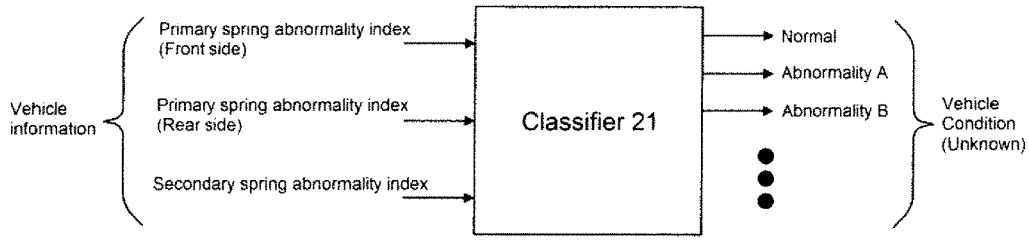

FIGS. 1A and 1B are block diagrams for illustrating a classifier of a determination device which is included in a monitoring apparatus according to the first embodiment. FIG. 1A is a block diagram illustrating the manner of generating a classifier using machine learning. FIG. 1B is a block diagram illustrating the manner of determining a vehicle condition using the generated classifier.

The monitoring apparatus 100 according to the first embodiment executes a first step in which vehicle information represented by a wheel load or the like of wheels which are included in a railway vehicle running on a railroad track is detected by the detection device 1, and a second step in which the detected vehicle information is input to the classifier 21 of the determination device 2 and a vehicle condition such as the presence or absence of an abnormality of the railway vehicle (a railway vehicle of which vehicle condition is unknown) is output from the classifier 21 (see FIG. 1B).

An object to which the monitoring apparatus 100 according to the first embodiment is applied is a railway vehicle having a pair of front and rear bogies which each have two pairs of right and left wheels in front and rear sides.

The vehicle information which is detected in the first step (vehicle information which is input to the classifier 21) is, as illustrated in FIG. 1B, made a primary spring abnormality index of a front bogie and a primary spring abnormality index of a rear bogie of the railway vehicle which are represented by the following Expression (1) and Expression (2), respectively, and a secondary spring abnormality index of the railway vehicle which is represented by the following Expression (3).

primary spring abnormality index of front bogie=
    $(P1+P4)-(P2+P3)$ (1)

primary spring abnormality index of rear bogie=
    $(P5+P8)-(P6+P7)$ (2)

secondary spring abnormality index of railway
    vehicle=$(P1+P3+P6+P8)-(P2+P4+P5+P7)$ (3)

where P1 represents a wheel load of a wheel located in a front right side of the front bogie, P2 represents a wheel load of a wheel located in a front left side of the front bogie, P3 represents a wheel load of a wheel located in a rear right side of the front bogie, P4 represents a wheel load of a wheel located in a rear left side of the front bogie, P5 represents a wheel load of a wheel located in a front right side of the rear bogie, P6 represents a wheel load of a wheel located in a front left side of the rear bogie, P7 represents a wheel load of a wheel located in a rear right side of the rear bogie, and P8 represents a wheel load of a wheel located in a rear left side of the rear bogie.

As described above, the respective abnormality indexes which are represented by the above Expressions (1) to (3) are calculated by the calculation unit 12 which the detection device 1 includes.

Further, the vehicle condition which is output from the classifier 21 in the second step is, as illustrated in FIG. 1B, a presence or absence of an abnormality of the railway vehicle as well as a class of an abnormality. Specifically, a naive Bayes classifier as described later is adopted as the classifier 21 of the first embodiment, and hence the classifier 21 calculates a probability that the railway vehicle is normal, and a probability that abnormalities of respective classes (for convenience, only an abnormality A and an abnormality B are listed in FIG. 1B) are occurring in the railway vehicle. Furthermore, as a final determination result, the determination device 2 outputs the vehicle condition with the highest probability among the probabilities that abnormalities of the respective classes are occurring which were output from the classifier 21.

As illustrated in FIG. 1A, the classifier 21 which is used in the aforementioned second step is generated by means of machine learning which is performed by using training data (a combination of vehicle information which is input and a vehicle condition which is output) of a railway vehicle of which the vehicle condition is known, the training data being the vehicle information and the vehicle condition which is known, the machine learning being performed so that when the vehicle information of the training data is input to the classifier, the classifier outputs the vehicle condition of the training data.

Specifically, when performing machine learning, training data with respect to a normal railway vehicle (a railway vehicle with no abnormalities) and training data with respect to an abnormal railway vehicle are required.

It is easy to prepare training data with respect to a normal railway vehicle since it is possible to actually detect vehicle information of a normal railway vehicle (primary spring abnormality index of a front bogie and primary spring abnormality index of a rear bogie of the railway vehicle, and secondary spring abnormality index of the railway vehicle). In contrast, training data with respect to an abnormal railway vehicle is not easy to prepare because it is difficult to actually detect the vehicle information since preparing an abnormal railway vehicle is in itself difficult (moreover, it is extremely difficult to prepare a large number of abnormal railway vehicles).

Consequently, regarding training data with respect to an abnormal railway vehicle, as such vehicle information, it is preferable to use training data which is calculated by means of numerical simulation based on vehicle information detected with respect to a normal railway vehicle.

That is, the classifier 21 which is used in the second step is preferably generated by means of machine learning which is performed by using, as vehicle information of the training data, a primary spring abnormality index of a front bogie, a primary spring abnormality index of a rear bogie and a secondary spring abnormality index of the railway vehicle which were actually detected with respect to a normal railway vehicle, and a primary spring abnormality index of a front bogie, a primary spring abnormality index of a rear bogie and a secondary spring abnormality index of the railway vehicle with respect to an abnormal vehicle which were calculated by means of numerical simulation based on a primary spring abnormality index of a front bogie, a primary spring abnormality index of a rear bogie and a secondary spring abnormality index of the railway vehicle with respect to a normal railway vehicle, and using, as vehicle condition of the training data, a known presence or absence of an abnormality and a known class of an abnormality with respect to a normal railway vehicle and an abnormal railway vehicle, the machine learning being performed so that when vehicle information of a normal railway vehicle and an abnormal railway vehicle is input to the classifier, the classifier outputs a vehicle condition of a normal railway vehicle and an abnormal railway vehicle.

A naive Bayes classifier is used as the classifier 21 of the first embodiment. Hereunder, a method of generating (machine learning method) the classifier 21 of the first embodiment and a determination method carried out by means of the classifier 21 are described more specifically referring to FIGS. 2A to 2C.

Figure 2A:
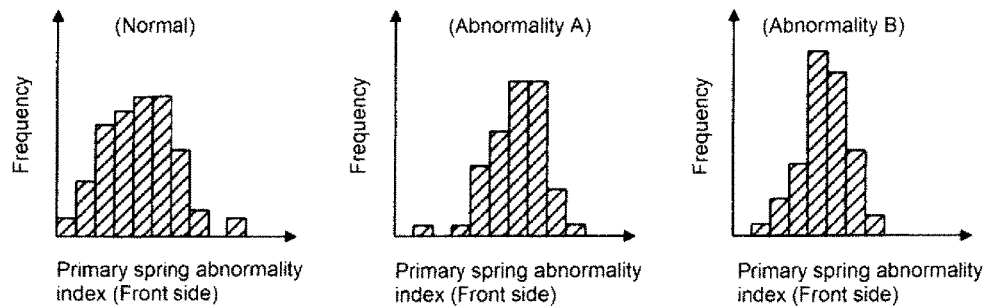
FIGS. 2A to 2C are explanatory drawings for illustrating a method for generating the classifier shown in FIGS. 1A and 1B as well as a determination method which uses the classifier.
Figure 2B:
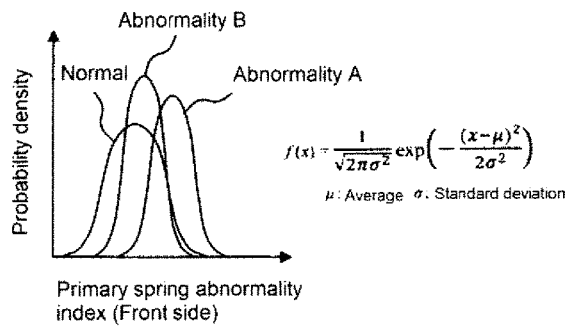
Figure 2C:
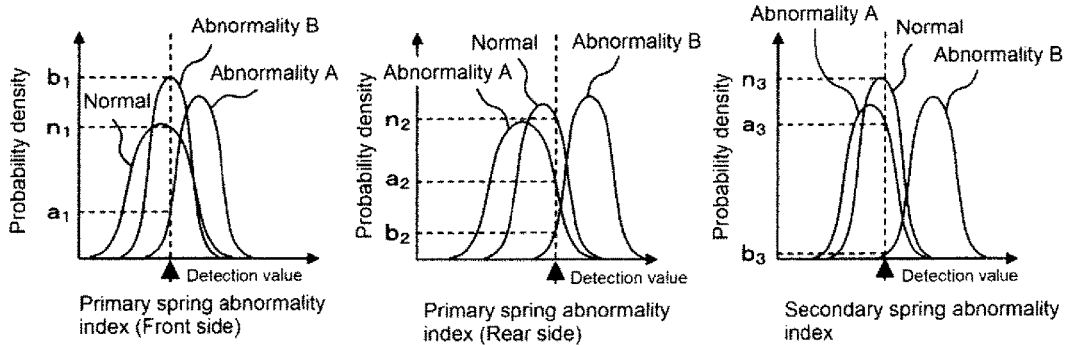

FIGS. 2A to 2C are explanatory drawings for illustrating a method of generating the classifier 21 and a determination method carried out by means of the classifier 21.

First, as illustrated in FIG. 2A, by inputting training data into the classifier 21, a frequency distribution with respect to vehicle information is formed for respective vehicle conditions. Although the example illustrated in FIG. 2A illustrates a frequency distribution of a primary spring abnormality index of a front bogie which is formed for respective vehicle conditions (normal, abnormality A, abnormality B), a similar frequency distribution is also formed with respect to other vehicle information in practice (primary spring abnormality index of a rear bogie, and secondary spring abnormality index of a railway vehicle). Further, although three vehicle conditions, namely, normal, abnormality A and abnormality B, are shown in the example illustrated in FIG. 2A for convenience, a number of frequency distributions corresponding to the number of abnormality classes are formed in practice.

Next, as illustrated in FIG. 2B, normal distributions (probability density distributions) are formed based on the frequency distributions which were formed as described above. Although in the example illustrated in FIG. 2B, normal distributions of the primary spring abnormality index of the front bogie which are formed for the respective vehicle conditions (normal, abnormality A, abnormality B) are shown in a superimposed manner, in practice, similar normal distributions are also formed with respect to other vehicle information (primary spring abnormality index of a rear bogie, and secondary spring abnormality index of a railway vehicle) (see FIG. 2C), and are stored.

In this way, the classifier 21 is generated.

Note that, in a case where vehicle information with respect to an abnormal railway vehicle can be actually detected, as described above referring to FIG. 2A, it is possible to form frequency distributions of the vehicle information which is actually detected with respect to the abnormal railway vehicle (with respect to abnormality A and abnormality B) also, and to form the normal distributions (probability density distributions) shown in FIG. 2B based on the frequency distributions.

However, as described above, because actually detecting vehicle information with respect to an abnormal railway vehicle is difficult, it is conceivable to calculate the vehicle information for an abnormal railway vehicle by numerical simulation using vehicle information which was detected with respect to a normal railway vehicle. Specifically, it is conceivable to form normal distributions (probability density distributions) (in the example illustrated in FIG. 2B, the normal distributions of abnormality A and abnormality B) of vehicle information with respect to an abnormal railway vehicle, for example, by the procedure in the following (1) to (4).

(1) Assuming a normal railway vehicle, numerical simulation is executed using general-purpose mechanism analysis software (for example, "SIMPACK", a multi-body dynamic analysis tool manufactured by SIMPACK Japan K.K.), and numerical calculation results are calculated with respect to vehicle information (primary spring abnormality index of a front bogie, primary spring abnormality index of a rear bogie, and secondary spring abnormality index of the railway vehicle).

(2) Assuming an abnormal railway vehicle, numerical simulation is executed using the aforementioned general-purpose mechanism analysis software, and numerical calculation results are calculated with respect to vehicle information (primary spring abnormality index of a front bogie, primary spring abnormality index of a rear bogie, and secondary spring abnormality index of the railway vehicle). At such time, numerical calculation results are calculated for each assumed abnormality class (in the example illustrated in FIG. 2B, abnormality A and abnormality B).

(3) Based on the above (1) and (2), it is determined how much the vehicle information changes between the normal railway vehicle and the abnormal railway vehicle, and the amount of change is also determined. That is, the numerical calculation result for the normal railway vehicle which is calculated in the above (1) is subtracted from the numerical calculation result for the abnormal railway vehicle which is calculated in the above (2) to thereby determine the aforementioned amount of change.

(4) A normal distribution (probability density distribution) (see FIG. 2B) formed using vehicle information which was actually detected with respect to a normal railway vehicle as described above is shifted by shifting a mean value $\mu$ thereof by an amount corresponding to the amount of change determined in the above (3) without changing a standard deviation a thereof, and the shifted normal distribution is calculated as the normal distribution of the vehicle information with respect to the abnormal railway vehicle. This is a calculation method which is based on the assumption that, with regard to a normal distribution of vehicle information for a normal railway vehicle and a normal distribution of vehicle information for an abnormal railway vehicle, although the respective mean values $\mu$ of the normal distributions are different to each other, the respective standard deviations a of the normal distributions are equal.

Next, as illustrated in FIG. 2C, the respective items of vehicle information (primary spring abnormality index of the front bogie, primary spring abnormality index of the rear bogie, and secondary spring abnormality index of the railway vehicle) detected in the first step are input to the classifier 21 which was generated as described above (locations displayed as "detection value" in FIG. 2C indicate the respective items of vehicle information which are input). The classifier 21 calculates the probability of being the respective vehicle conditions in accordance with the values of the respective items of vehicle information which were input. In the example illustrated in FIG. 2C, in accordance with the input value for the primary spring abnormality index of the front bogie, a probability that the railway vehicle is normal, a probability that the abnormality A is occurring in the railway vehicle and a probability that the abnormality B is occurring in the railway vehicle are calculated as $n_1$, $a_1$ and $b_1$, respectively. Further, in accordance with the input value for the primary spring abnormality index of the rear bogie, a probability that the railway vehicle is normal, a probability that the abnormality A is occurring in the railway vehicle and a probability that the abnormality B is occurring in the railway vehicle are calculated as $n_2$, $a_2$ and $b_2$, respectively. In addition, in accordance with the input value for the secondary spring abnormality index of the railway vehicle, a probability that the railway vehicle is normal, a probability that the abnormality A is occurring in the railway vehicle and a probability that the abnormality B is occurring in the railway vehicle are calculated as $n_3$, $a_3$ and $b_3$, respectively.

Based on the probabilities that were calculated as described above, the classifier 21 calculates a probability $P_N$ that the railway vehicle is normal (Expression (4) in FIG. 2C), a probability $P_A$ that the abnormality A is occurring in the railway vehicle (Expression (5) in FIG. 2C), and a probability $P_B$ that the abnormality B is occurring in the railway vehicle (Expression (6) in FIG. 2C).

Lastly, as the final determination result, the determination device 2 outputs a vehicle condition with the highest probability among the probabilities $P_N$, $P_A$ and $P_B$ which the classifier 21 calculated.

Hereunder, an example of results of determining the presence or absence of an abnormality of a railway vehicle and a class of an abnormality by means of the monitoring apparatus 100 according to the first embodiment will be described.

With respect to five kinds of train compositions (a composition, b composition, c composition, d composition, and e composition) of X series trains, under the conditions described below, vehicle information (primary spring abnormality index of a front bogie, primary spring abnormality index of a rear bogie, and secondary spring abnormality index of a railway vehicle) was detected when passing a curved section of railroad track, the classifier 21 was generated by means of machine learning using the detected vehicle information, and vehicle conditions were determined by inputting the detected vehicle information into the generated classifier 21.

(A) Curved Section Taken as Object

Entrance transition curve: length 47 m

Circular curve: length 60.1 m, radius 251 m, cant 0.065 m, slack 0.009 m

Exit transition curve: length 47 m

Wheel load sensors installation position: position 15 m from starting point of circular curve (B) Data Used Training data: vehicle information (amount for 10 days) which was detected with respect to normal railway vehicles which passed through the aforementioned curved section, and vehicle information for abnormal railway vehicles and classes of the abnormalities thereof which were calculated by means of numerical simulation based on the aforementioned detected vehicle information for normal railway vehicles Determination object data: vehicle information (amount for 13 days after training data acquisition) which was detected with respect to normal railway vehicles which passed through the aforementioned curved section, and vehicle information for abnormal railway vehicles calculated by means of numerical simulation using general-purpose mechanism analysis software based on the aforementioned detected vehicle information for normal railway vehicles Note that, with respect to the classes of abnormalities which are included in the training data and the classes of abnormalities which are determined in accordance with the determination object data, respectively, the following six classes were assumed as abnormality classes:

(1) An abnormality in which a leveling valve connected to an air spring provided on an inner rail side of a front bogie failed and remains in a condition of performing an exhaust operation (abbreviated as "front inner rail exhaust"), (2) An abnormality in which a leveling valve connected to an air spring provided on an outer rail side of a front bogie failed and remains in a condition of performing an exhaust operation (abbreviated as "front outer rail exhaust"), (3) An abnormality in which a leveling valve connected to an air spring provided on an inner rail side of a front bogie failed and remains in a condition of performing an air supply operation (abbreviated as "front inner rail air supply"), (4) An abnormality in which a leveling valve connected to an air spring provided on an outer rail side of a front bogie failed and remains in a condition of performing an air supply operation (abbreviated as "front outer rail air supply"), (5) Breakage of an axle spring on a front inner rail side of a front bogie (abbreviated as "single-axle inner rail breakage").

(6) Breakage of an axle spring on a front outer rail side of a front bogie (abbreviated as "single-axle outer rail breakage").

FIG. 3 shows determination results which were obtained when vehicle information of abnormal railway vehicles among the aforementioned determination object data was input to the classifier 21.

As shown in FIG. 3, the abnormality classes which were output as the determination results completely matched the assumed (simulated) abnormality classes.

It is thus found that, according to the monitoring apparatus 100 of the first embodiment, it is possible to accurately determine the classes of abnormalities of abnormal railway vehicles.

FIG. 4 shows determination results which were obtained when vehicle information of normal railway vehicles among the aforementioned determination object data was input to the classifier 21.

As shown in FIG. 4, most of the determination results are determined as normal.

It is thus found that, according to the monitoring apparatus 100 of the first embodiment, it is possible to determine normal railway vehicles in a comparatively accurate manner.

Second Embodiment

Figure 5A:
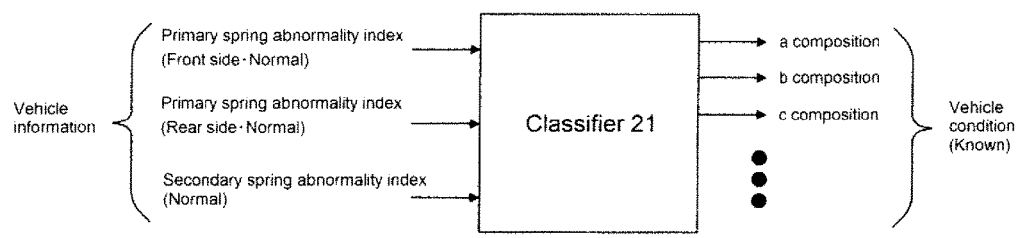
FIGS. 5A and 5B are block diagrams for illustrating a classifier included in a determination device of a railway vehicle condition monitoring apparatus according to a second embodiment of the present invention.
Figure 5B:
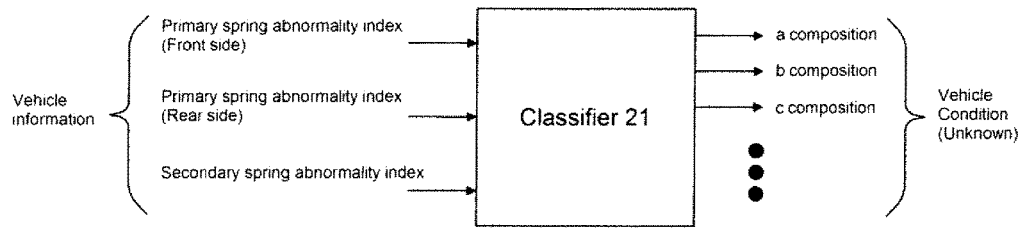

FIGS. 5A and 5B are block diagrams for illustrating a classifier of a determination device which is included in a monitoring apparatus according to the second embodiment. FIG. 5A is a block diagram illustrating the manner of generating a classifier using machine learning. FIG. 5B is a block diagram illustrating the manner of determining a vehicle condition using the generated classifier.

The monitoring apparatus 100 according to the second embodiment also executes, in the same way as the first embodiment, a first step in which vehicle information represented by a wheel load or the like of wheels which are included in a railway vehicle running on a railroad track is detected by the detection device 1, and a second step in which the detected vehicle information is input to the classifier 21 of the determination device 2 and a vehicle condition of the railway vehicle (a railway vehicle of which vehicle condition is unknown) is output from the classifier 21 (see FIG. 5B).

The second embodiment differs from the first embodiment in the respect that a vehicle condition which is output from the classifier 21 in the second step is a train composition of a railway vehicle, and not the presence or absence of an abnormality and a class of an abnormality. More specifically, the classifier 21 calculates the probabilities of the train composition of the railway vehicle which is the determination object being respective train compositions, and the determination device 2 outputs the train composition with the highest probability among the probabilities for the respective train compositions which were output from the classifier 21 as a final determination result. Since it is not necessary to determine the presence or absence of an abnormality and the class of an abnormality, in the second embodiment, it is only required to prepare training data with respect to a normal railway vehicle as the training data, and training data with respect to an abnormal railway vehicle is not necessarily required.

Hereunder, an example of results of determining the train composition of a railway vehicle by means of the monitoring apparatus 100 according to the second embodiment will be described.

With respect to ten kinds of train compositions (a composition, b composition, c composition, d composition, e composition, f composition, g composition, h composition, i composition, j composition) of X series trains and eleven kinds of train compositions (k composition, l composition, m composition, n composition, o composition, p composition, q composition, r composition, s composition, t composition, u composition) of Y series trains, under the conditions described below, vehicle information (primary spring abnormality index of a front bogie, primary spring abnormality index of a rear bogie, and secondary spring abnormality index of a railway vehicle) was detected when passing a curved section of railroad track, the classifier 21 was generated by means of machine learning using the detected vehicle information, and vehicle conditions were determined by inputting the detected vehicle information into the generated classifier 21.

(A) Curved Section Taken as Object

Entrance transition curve: length 47 m

Circular curve: length 60.1 m, radius 251 m, cant 0.065 m, slack 0.009 m

Exit transition curve: length 47 m

Wheel load sensors installation position: position 15 m from starting point of circular curve (B) Data Used Training data: vehicle information (amount for 10 days) which was detected with respect to normal railway vehicles which passed through the aforementioned curved section Determination object data: vehicle information (amount for 20 days after training data acquisition) which was detected with respect to normal railway vehicles which passed through the aforementioned curved section FIG. 6 shows determination results which were obtained when the above-described determination object data was input to the classifier 21.

As shown in FIG. 6, in the case of most of the determination results, results were obtained which matched the actual train compositions.

It is thus found that, according to the monitoring apparatus 100 of the second embodiment, train compositions can also be determined in a comparatively accurate manner.

REFERENCE SIGNS LIST

1 Detection device
2 Determination device
3 Railway vehicle
11 Wheel load sensor
12 Calculation unit
21 Classifier
31 Wheel
100 Railway vehicle condition monitoring apparatus

The invention claimed is:

1. A railway vehicle condition monitoring apparatus, comprising:
a detection device including a sensor to detect vehicle information represented by a wheel load of a wheel included in a railway vehicle running on a railroad track; and
a determination device including a classifier to which the vehicle information detected by the detection device is input and which is configured to output a vehicle condition such as a presence or absence of an abnormality of the railway vehicle, wherein
the railway vehicle includes a pair of front and rear bogies which each have two pairs of right and left wheels in front and rear sides;
vehicle information which is detected by the detection device is a primary spring abnormality index of the front bogie and a primary spring abnormality index of the rear bogie of the railway vehicle which are represented by Expression (1) and Expression (2) below, respectively, and a secondary spring abnormality index of the railway vehicle which is represented by Expression (3) below;
a vehicle condition which is output from the classifier is a presence or absence of an abnormality and a class of an abnormality of the railway vehicle;
the classifier is generated by using machine learning which is performed by using training data of a railway vehicle of which the vehicle condition is known, the training data being the vehicle information and the vehicle condition which is known, the machine learning being performed so that when the vehicle information of the training data is input to the classifier, the classifier outputs the vehicle condition of the training data;
and
the classifier is generated by using machine learning which is performed by using, as the vehicle information of the training data, the primary spring abnormality index of the front bogie, the primary spring abnormality index of the rear bogie and the secondary spring abnormality index of the railway vehicle which are actually detected by the detection device with respect to a normal railway vehicle, and the primary spring abnormality index of the front bogie, the primary spring abnormality index of the rear bogie and the secondary spring abnormality index of the railway vehicle with resect to an abnormal railway vehicle which are calculated by using numerical simulation based on the primary spring abnormality index of the front bogie, the primary spring abnormality index of the rear bogie and the secondary spring abnormality index of the railway vehicle with respect to the normal railway vehicle, and using, as the vehicle condition of the training data, a known presence or absence of an abnormality and a known class of an abnormality with respect to the normal railway vehicle and the abnormal railway vehicle, the machine learning being performed so that when vehicle information of the normal railway vehicle and the abnormal railway vehicle is input to the classifier, the classifier outputs a vehicle condition of the normal railway vehicle and the abnormal railway vehicle, $$\text{primary spring abnormality index of front bogie} = (P1+P4)-(P2+P3) \tag{1}$$

$$\text{primary spring abnormality index of rear bogie} = (P5+P8)-(P6+P7) \tag{2}$$

$$\text{secondary spring abnormality index of railway vehicle} = (P1+P3+P6+P8)-(P2+P4+P5+P7) \tag{3}$$

where P1 represents a wheel load of a wheel located in a front right side of the front bogie, P2 represents a wheel load of a wheel located in a front left side of the front bogie, P3 represents a wheel load of a wheel located in a rear right side of the front bogie, P4 represents a wheel load of a wheel located in a rear left side of the front bogie P5 represents a wheel load of a wheel located in a front right side of the rear bogie, P6 represents a wheel load of a wheel located in a front left side of the rear bogie, P7 represents a wheel load of a wheel located in a rear right side of the rear bogie, and P8 represents a wheel load of a wheel located in a rear left side of the rear bogie.

2. A railway vehicle condition monitoring apparatus, comprising:
a detection device including a sensor to detect vehicle information represented by a wheel load of a wheel included in a railway vehicle running on a railroad track; and
a determination device including a classifier to which the vehicle information detected by the detection device is input and which is configured to output a vehicle condition such as a presence or absence of an abnormality of the railway vehicle, wherein
the railway vehicle includes a pair of front and rear bogies which each have two pairs of right and left wheels in front and rear sides;
vehicle information which is detected by the detection device is a primary spring abnormality index of the front bogie and a primary spring abnormality index of the rear bogie of the railway vehicle which are represented by Expression (1) and Expression (2) below, respectively, and a secondary spring abnormality index of the railway vehicle which is represented by Expression (3) below;
a vehicle condition which is output from the classifier is a train composition of the railway vehicle; and
the classifier is generated by using machine learning which is performed by using training data of the railway vehicle of which the vehicle condition is known, the training data being the vehicle information and the vehicle condition which is known, the machine learning being performed so that when the vehicle information of the training data is input to the classifier, the classifier outputs the vehicle condition of the training data, $$\text{primary spring abnormality index of front bogie} = (P1+P4)-(P2+P3) \quad (1)$$

$$\text{primary spring abnormality index of rear bogie} = (P5+P8)-(P6+P7) \quad (2)$$

$$\text{secondary spring abnormality index of railway vehicle} = (P1+P3+6+P8)-(P2+P4+P5+P7) \quad (3)$$

where P1 represents a wheel load of a wheel located in a front right side of the front bogie, P2 represents a wheel load of a wheel located in a front left side of the front bogie, P3 represents a wheel load of a wheel located in a rear right side of the front bogie, P4 represents a wheel load of a wheel located in a rear left side of the front bogie, P5 represents a wheel load of a wheel located in a front right side of the rear bogie, P6 represents a wheel load of a wheel located in a front left side of the rear bogie, P7 represents a wheel load of a wheel located in a rear right side of the rear bogie, and P8 represents a wheel load of a wheel located in a rear left side of the rear bogie.

3. The railway vehicle condition monitoring apparatus according to claim 1, wherein the sensor included in the detection device is provided on the railroad track.

4. The railway vehicle condition monitoring apparatus according to claim 1, wherein the sensor included in the detection device is provided on the railway vehicle.

5. The railway vehicle condition monitoring apparatus according to claim 1, wherein the classifier is a naive Bayes classifier.

6. The railway vehicle condition monitoring apparatus according to claim 2, wherein the sensor included in the detection device is provided on the railroad track.

7. The railway vehicle condition monitoring apparatus according to claim 2, wherein the sensor included in the detection device is provided on the railway vehicle.

8. The railway vehicle condition monitoring apparatus according to claim 2, wherein the classifier is a naive Bayes classifier.

* * * * *